(12) United States Patent
Niu et al.

(10) Patent No.: US 10,467,970 B2
(45) Date of Patent: Nov. 5, 2019

(54) DISPLAY PANEL, DISPLAY MODULE, METHOD FOR DRIVING DISPLAY MODULE, DRIVING DEVICE AND DISPLAY DEVICE

(71) Applicant: BOE TECHNOLOGY GROUP CO., LTD., Beijing (CN)

(72) Inventors: Xiaochen Niu, Beijing (CN); Xue Dong, Beijing (CN); Xiaochuan Chen, Beijing (CN); Wenqing Zhao, Beijing (CN); Pengcheng Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 134 days.

(21) Appl. No.: 15/682,222

(22) Filed: Aug. 21, 2017

(65) Prior Publication Data

US 2018/0122312 A1 May 3, 2018

(30) Foreign Application Priority Data

Oct. 28, 2016 (CN) .......................... 2016 1 0963775

(51) Int. Cl.
*G09G 3/36* (2006.01)
*H04N 13/31* (2018.01)
(Continued)

(52) U.S. Cl.
CPC ........... *G09G 3/3607* (2013.01); *G09G 3/003* (2013.01); *G09G 3/2003* (2013.01);
(Continued)

(58) Field of Classification Search
None
See application file for complete search history.

(56) References Cited

U.S. PATENT DOCUMENTS

2005/0041188 A1 2/2005 Yamazaki
2006/0279547 A1* 12/2006 Karman ................. H04N 13/31
345/169
(Continued)

FOREIGN PATENT DOCUMENTS

| CN | 102621702 A | 8/2012 |
|----|-------------|---------|
| CN | 104599626 A | 5/2015 |
| CN | 104978941 A | 10/2015 |
| CN | 106019599 A | 10/2016 |
| JP | 2005062416 A | 3/2005 |

OTHER PUBLICATIONS

First Office Action for Chinese Application No. 201610963775.8, dated Apr. 21, 2017, 6 Pages.
(Continued)

*Primary Examiner* — Sepehr Azari
(74) *Attorney, Agent, or Firm* — Brooks Kushman P.C.

(57) ABSTRACT

The present disclosure provides a display panel, a display module, a method for driving the display module, a driving device and a display device. The display panel includes a plurality of pixel repeat units, each of the pixel repeat units includes first monochromatic sub-pixels, second monochromatic sub-pixels and third monochromatic sub-pixels of different colors, each of the pixel repeat units includes three pixel units arranged in sequence in a row direction, each of the pixel unit includes two monochromatic sub-pixels in a first row and two monochromatic sub-pixels in a second row, the two monochromatic sub-pixels in the first row and the two monochromatic sub-pixels in the second row are staggered, and a color of each monochromatic sub-pixel is different from colors of adjacent monochromatic sub-pixels.

20 Claims, 5 Drawing Sheets

(51) Int. Cl.
  *G09G 3/20* (2006.01)
  *H04N 13/398* (2018.01)
  *H04N 13/257* (2018.01)
  *G09G 3/00* (2006.01)
  *H04N 13/324* (2018.01)
  *H04N 13/351* (2018.01)

(52) U.S. Cl.
  CPC ......... *G09G 3/2074* (2013.01); *H04N 13/257* (2018.05); *H04N 13/31* (2018.05); *H04N 13/324* (2018.05); *H04N 13/351* (2018.05); *H04N 13/398* (2018.05); *G09G 2300/0452* (2013.01)

(56) References Cited

U.S. PATENT DOCUMENTS

| | | | |
|---|---|---|---|
| 2008/0043092 A1* | 2/2008 | Evans | G02B 27/2214 348/36 |
| 2016/0234488 A1* | 8/2016 | Zhao | H04N 13/363 |
| 2016/0379533 A1 | 12/2016 | Guo et al. | |
| 2017/0154555 A1 | 6/2017 | Wei | |

OTHER PUBLICATIONS

Search Report for Chinese Application No. 201610963775.8, dated Feb. 16, 2017, 7 Pages.

\* cited by examiner

DISPLAY PANEL, DISPLAY MODULE, METHOD FOR DRIVING DISPLAY MODULE, DRIVING DEVICE AND DISPLAY DEVICE

CROSS-REFERENCE TO RELATED APPLICATION

The present application claims priority to Chinese patent application No. 201610963775.8 filed on Oct. 28, 2016, which is incorporated herein by reference in its entirety.

TECHNICAL FIELD

The present disclosure relates to the field of displaying, in particular to a display panel, a display module, a method for driving a display module, a driving device and a display device.

BACKGROUND

At present, three-dimensional (3D) display devices are popular in the market due to their advantages of vivid expressive force and powerful and shocking visual impact. As a principle of the 3D display, a left eye and a right eye of a viewer receives images having a little difference from each other, i.e., a left-eye image and a right-eye image respectively, the two views are integrated by the brain of the viewer, and thereby making the viewer to sense a depth of an object presented by the integrated image, so as to generate a three-dimensional image.

An early 3D display device requires the viewer to wear 3D glasses, which makes applications of the 3D display device being limited to places and facilities. A naked-eye 3D display device developed in recent years has overcome the defect of the early 3D display device, and therefore the naked-eye 3D display device has attracted great attentions.

As shown in FIG. 1, the naked-eye 3D display device in a related art includes: a display panel 11 and a grating 12 located at a light-exiting side of the display panel 11. The display panel includes a plurality of display units 1 for displaying a left-eye image and a plurality of display units 2 for displaying a right-eye image. The grating 12 includes a light-transmissible region (a white rectangular region) and a light shielding region (a black rectangular region), the grating 12 may divide an image, which enables the left eye to see merely the left-eye image and enables the right eye to see merely the right-eye image theoretically as shown in FIG. 1, thus generating a stereoscopic effect.

However, a disadvantage of a naked-eye 3D display technology based on the above-described binocular parallax theory is that, a good 3D effect can only be seen at a specific location, and if a distance between a location of the user and a best viewing location (FIG. 1 shows the best viewing location) is not an integral multiple of an interorbital width of the viewer, each eye of the viewer will see both of the left-eye image and the right-eye image simultaneously through the grating 12, which adversely affect the display quality due to crosstalk phenomenon to the images.

Thus it can be seen that, the naked-eye 3D display technology in the related art cannot provide continuous viewable locations.

SUMMARY

An object of the present disclosure is to solve the technical problem that the naked-eye 3D display technology cannot provide continuous viewable locations.

In order to achieve the above object, in one aspect, the present disclosure provides a display panel including a plurality of pixel repeat units, each of the pixel repeat units includes first monochromatic sub-pixels, second monochromatic sub-pixels and third monochromatic sub-pixels of different colors, each of the pixel repeat units includes three pixel units arranged in sequence in a row direction, each of the pixel units includes two monochromatic sub-pixels in a first row and two monochromatic sub-pixels in a second row, the two monochromatic sub-pixels in the first row and the two monochromatic sub-pixels in the second row are staggered at a pre-determined width, and in the display panel, a color of each monochromatic sub-pixel is different from colors of adjacent monochromatic sub-pixels.

Furthermore, the pre-determined width is half a width of the monochromatic sub-pixel in the row direction.

Furthermore, the first monochromatic sub-pixel is a red sub-pixel, the second monochromatic sub-pixel is a green sub-pixel, and the third monochromatic sub-pixel is a blue sub-pixel.

In another aspect, the present disclosure provides a display module including the above display panel and an optical component arranged at a light-exiting side of the display panel, wherein the optical component includes a plurality of optical units, each of the optical unit corresponds to a user-visible region and at least one pixel unit, and the pixel unit to which each optical unit corresponds is configured to form an image in the visible region to which the optical unit corresponds.

Furthermore, the optical component is a grating structure, the grating structure includes a plurality of light-shielding patterns, each of the light-shielding patterns comprises a plurality of light-shielding sub-patterns, in a same light-shielding pattern, the light-shielding sub-patterns are arranged in a column direction and in different rows, the light-shielding sub-patterns in two adjacent rows are staggered at a pre-determined width, and two light-shielding sub-patterns spaced apart from each other at intervals of one light-shielding sub-pattern are aligned with each other. A width of each light-shielding sub-pattern in the row direction is twice a width of the monochromatic sub-pixel in the row direction, and a distance between two adjacent light-shielding sub-patterns in a same row is equal to the width of the light-shielding sub-pattern in the row direction.

Furthermore, the first monochromatic sub-pixel is a red sub-pixel, the second monochromatic sub-pixel is a green sub-pixel, and the third monochromatic sub-pixel is a blue sub-pixel.

In addition, the present disclosure further provides a method for driving the above display module, including: acquiring display images from a plurality of shooting angles; determining the grayscale voltages of the respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and driving the monochromatic sub-pixels in each pixel unit according to the determined grayscale voltages of the respective monochromatic sub-pixels in the pixel unit.

Furthermore, in the display module, a connection region for the three monochromatic sub-pixels of different colors and adjacent to each other forms a special point. Determining the grayscale voltages of the respective monochromatic sub-pixels in each pixel unit includes: determining one or more display images from the corresponding shooting angles for the special points in each pixel unit according to locations of the special points in each pixel unit and the shooting angles of the display images; determining display images to which the respective monochromatic sub-pixels in each pixel unit correspond, wherein a display image to which one monochromatic sub-pixel corresponds is a display image to which all special points formed by the one monochromatic sub-pixel correspond; and determining the grayscale voltages of the respective monochromatic sub-pixels in each pixel unit, wherein the grayscale voltage of the one monochromatic sub-pixel is obtained by calculating a weight sum of the grayscale voltages of the one monochromatic sub-pixel in all display images corresponding to the one monochromatic sub-pixel.

Furthermore, the display image from each shooting angle includes a corresponding left-eye image and a corresponding right-eye image; pixel units of the display module are divided into first pixel units for displaying the left-eye image and second pixel units for displaying the right-eye image; the first pixel units and the second pixel units are arranged alternately in the row direction. The display images correspond to a first shooting angle, a second shooting angle, a third shooting angle and a fourth shooting angle, and the first shooting angle to the fourth shooting angle are deflected towards a first direction gradually. The left-eye images corresponding to the first, second, third, and fourth shooting angles include left-eye images $A_1$, $A_2$, $A_3$ and $A_4$ in sequence, right-eye images corresponding to the first, second, third, and fourth shooting angles include right-eye images $B_1$, $B_2$, $B_3$ and $B_4$ in sequence, and the shooting angles of the images $A_1$, $A_2$, $A_3$, $A_4$, $B_1$, $B_2$, $B_3$ and $B_4$ are deflected towards the first direction gradually. In the first pixel units, display images to which the monochromatic sub-pixels of the second pixel units most away from a side of the first direction correspond include the left-eye image $A_1$, the right-eye images $B_3$ and $B_4$; display images to which the monochromatic sub-pixels of the second pixel units second-most away from the side of the first direction correspond include the left-eye images $A_1$, $A_2$ and the right-eye image $B_4$; display images to which the monochromatic sub-pixels of the second pixel units second-nearest to the side of the first direction correspond include the left-eye images $A_1$, $A_2$, $A_3$; display images to which the monochromatic sub-pixels of the second pixel units nearest to the side of the first direction correspond include the left-eye images $A_2$, $A_3$ and $A_4$. In the second pixel units, display images to which the monochromatic sub-pixels of the first pixel units most away from a side of the second direction correspond include the right-eye images $B_4$, $B_3$, $B_2$; display images to which the monochromatic sub-pixels of the first pixel units second-most away from the side of the second direction correspond include the right-eye images $B_3$, $B_2$ and $B_1$; display images to which the monochromatic sub-pixels of the first pixel units second-nearest to the side of the second direction correspond include the right-eye images $B_2$, $B_1$ and the left-eye image $A_4$; display images to which the monochromatic sub-pixels of the first pixel units nearest to the side of the second direction correspond include the right-eye image $B_1$ and the left-eye images $A_4$, $A_3$. The second direction and the first direction are opposite to each other.

Furthermore, the display image from each shooting angle includes a corresponding left-eye image and a corresponding right-eye image; pixel units of the display module are divided into first pixel units for displaying the left-eye image and second pixel units for displaying the right-eye image; the first pixel units and the second pixel units are arranged alternately in the row direction. The display images correspond to a first shooting angle, a second shooting angle, a third shooting angle and a fourth shooting angle, and the first shooting angle to the fourth shooting angle are deflected towards a first direction gradually. Left-eye images corresponding to the first, second, third, and fourth shooting angles includes left-eye images $A_1$, $A_2$, $A_3$ and $A_4$ in sequence, right-eye images corresponding to the first, second, third, and fourth shooting angles include right-eye images $B_1$, $B_2$, $B_3$ and $B_4$ in sequence, and the shooting angles of the images $A_1$, $A_2$, $A_3$, $A_4$, $B_1$, $B_2$, $B_3$ and $B_4$ are deflected towards the first direction gradually. In the first pixel units, display images to which the monochromatic sub-pixels of the second pixel units most away from a side of the first direction correspond include the left-eye images $A_1$, $A_2$ and $A_3$; display images to which the monochromatic sub-pixels of the second pixel units second-most away from the side of the first direction correspond include the left-eye images $A_2$, $A_3$ and $A_4$; display images to which the monochromatic sub-pixels of the second pixel units second-nearest to the side of the first direction correspond include the left-eye images $A_3$, $A_4$ and the right-eye image $B_1$; display images to which the monochromatic sub-pixels of the second pixel units nearest to the side of the first direction correspond include the left-eye image $A_4$ and the right-eye images $B_1$, $B_2$. In the second pixel units, display images to which the monochromatic sub-pixels of the first pixel units most away from a side of the second direction correspond include the left-eye images $A_1$, $A_2$ and the right-eye image $B_4$; display images to which the monochromatic sub-pixels of the first pixel units second-most away from the side of the second direction correspond include the left-eye image $A_1$ and the right-eye images $B_4$, $B_3$; display images to which the monochromatic sub-pixels of the first pixel units second-nearest to the side of the second direction correspond include the right-eye images $B_4$, $B_3$ and $B_2$; display images to which the monochromatic sub-pixels of the first pixel units nearest to the side of the second direction correspond include the right-eye images $B_3$, $B_2$ and $B_1$.

Furthermore, the present disclosure further provides a driving device for driving the above display module, the driving device includes: an acquiring circuit configured to acquire display images from a plurality of shooting angles; a processing circuit configured to determine grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and a driving circuit configured to drive the monochromatic sub-pixels in each pixel unit according to the determined grayscale voltages of the respective monochromatic sub-pixels in the pixel unit.

Furthermore, the present disclosure further provides a display device including the above display module and the above driving device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

For the technical problem that the naked-eye 3D display technology in the related art cannot provide continuous viewable locations, the present disclosure provides a technical solution.

Figure 2:
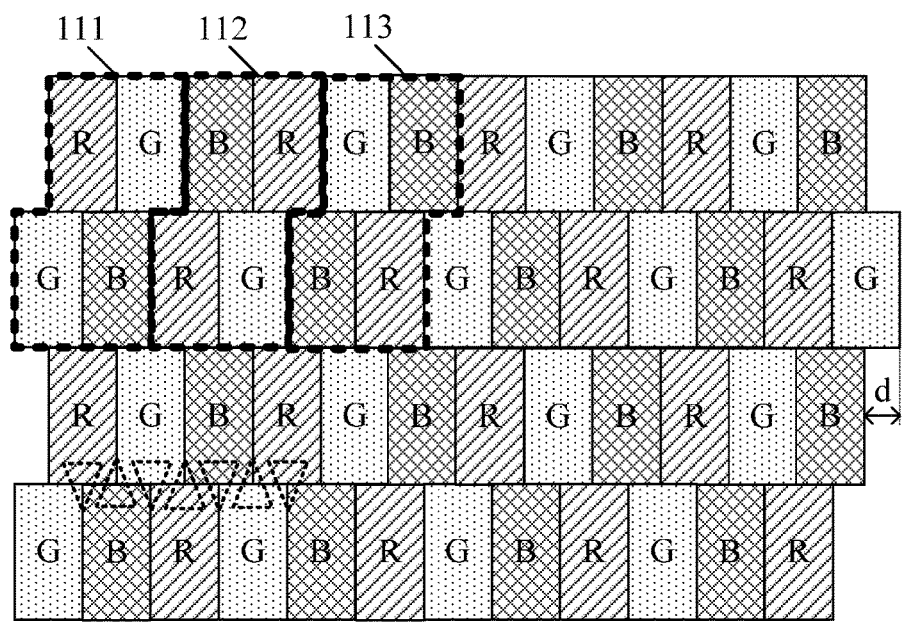
FIG. 2 is a schematic view showing a structure of a display panel according to the present disclosure.

In one aspect, the present disclosure provides in at least one embodiment a display panel, as shown in FIG. 2, the display panel includes a plurality of pixel repeat units, wherein each of the pixel repeat units includes first monochromatic sub-pixels, second monochromatic sub-pixels and third monochromatic sub-pixels of different colors (in this embodiment, for an example, the first monochromatic sub-pixels are red sub-pixels, the second monochromatic sub-pixels are green sub-pixels, and the third monochromatic sub-pixels are blue sub-pixels), and each of the pixel repeat units further includes three pixel units 111, 112 and 113 arranged in sequence in a row direction. Each of the pixel units 111, 112 and 113 further includes two monochromatic sub-pixels in a first row and two monochromatic sub-pixels in a second row, the two monochromatic sub-pixels in the first row and the two monochromatic sub-pixels in the second row are staggered at a pre-determined width d. Optionally, the pre-determined width d is half a width of the monochromatic sub-pixel in the row direction.

In the display panel, according to this embodiment, a color of each monochromatic sub-pixel is different from colors of adjacent monochromatic sub-pixels.

On the basis of the structure shown in FIG. 2, in this embodiment, a connection region for the three monochromatic sub-pixels of different colors and adjacent to each other forms a special point (i.e., a delta-shaped region represented by dotted lines in FIG. 2). After emitting light by the monochromatic sub-pixels, a hybrid light of pre-determined colors may be formed at a region to which the special point corresponds. Obviously, it can be seen from FIG. 2 that, in one pixel unit according to this embodiment, there may be a plurality of special points arranged laterally, and therefore the user may be provided with more viewing locations.

Figure 11:
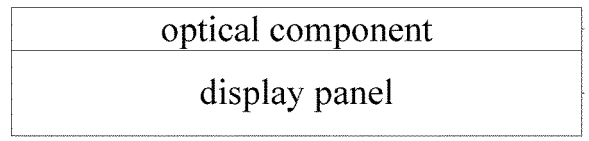
FIG. 11 is a schematic view showing a display module according to the present disclosure.

In another aspect, as shown in FIG. 11, a display module according to the present disclosure includes the above display panel and an optical component arranged at a light-exiting side of the display panel. The optical component includes a plurality of optical units, each of the optical units corresponds to a user-visible region and at least one pixel unit, and the pixel unit to which each optical unit corresponds is configured to form an image in the visible region to which the optical unit corresponds.

Figure 3:
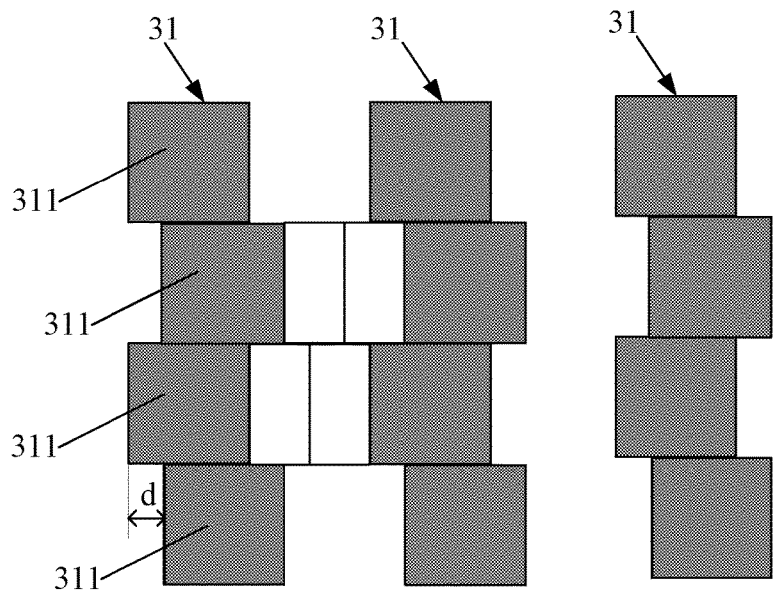
FIG. 3 is a schematic view showing a structure of an optical component according to the present disclosure.

As an exemplary introduction, specifically, the optical component according to the present disclosure is a grating structure. As shown in FIG. 3, the grating structure includes a plurality of light-shielding patterns 31.

Each of the light-shielding patterns 31 includes a plurality of light-shielding sub-patterns 311, in a same light-shielding pattern 31, the light-shielding sub-patterns 311 are arranged in a column direction and in different rows, the light-shielding sub-patterns 311 in two adjacent rows are staggered at a pre-determined width d, and two light-shielding sub-patterns 311 spaced apart from each other at an interval of one light-shielding sub-pattern 311 are aligned with each other. A width of each light-shielding sub-pattern 311 in the row direction is twice a width of the monochromatic sub-pixel 32 in the row direction, and a distance between two adjacent light-shielding sub-patterns 311 in a same row is equal to twice the width of the light-shielding sub-pattern 311 in the row direction, that is, a spacer region between two adjacent light-shielding sub-patterns 311 in the row direction exactly accommodates two monochromatic sub-pixels 32.

Obviously, on the basis of the structure shown in FIG. 3 of the present disclosure, a shape of a light-transmissible region between two adjacent light-shielding patterns 31 corresponds to that of the pixel unit according to the present disclosure, such that the user may obtain a visible region matching the pixel unit through the light of the grating structure.

Obviously, as an optional solution of the optical component according to the present disclosure, the optical structure shown in FIG. 3 is for illustration purpose only, rather than to limit the scope of the present disclosure. As another optional solution, the optical component according to the present disclosure may be of a micro lens structure, that is, the optical component includes a plurality of micro lenses, and each of the micro lenses corresponds to a visible region corresponding to the shape of the pixel unit for the user.

Figure 4:
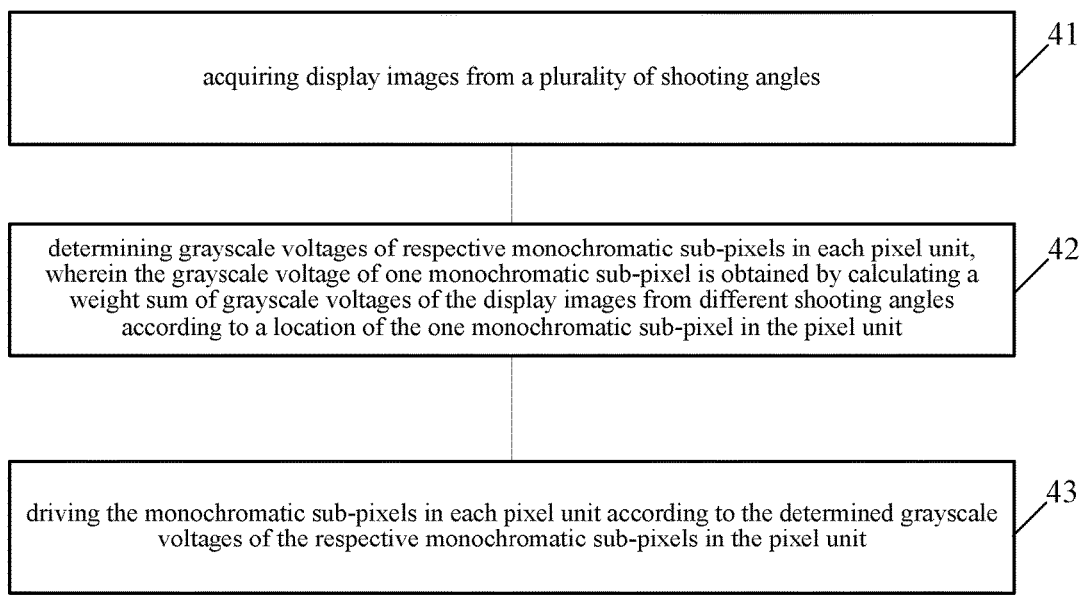
FIG. 4 is a flow chart of a driving method according to the present disclosure.

Based on the above-described display module, the present disclosure further provides a driving method, as shown in FIG. 4, the driving method include the following steps. Step 41: acquiring display images from a plurality of shooting angles. Step 42: determining grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit. Step 43: driving the monochromatic sub-pixels in each pixel unit according to the determined grayscale voltages of the respective monochromatic sub-pixels in the pixel unit.

On the basis of the driving method according to the present disclosure, there is a corresponding relation between a grayscale voltage of the monochromatic sub-pixel and a grayscale voltage of the display image of different shooting angles as well as a location of the monochromatic sub-pixel in the pixel unit, and in the present disclosure, it may determine grayscale voltages of respective monochromatic sub-pixels according to the corresponding relation, which enables the monochromatic sub-pixels at the different locations to display respective display images from appropriate shooting angles, so as to present a best viewing quality even if the user locates at a non-best viewing location.

Determining grayscale voltages of respective monochromatic sub-pixels in each pixel unit in step 42 will be described in a detail manner hereinafter.

Figure 12:
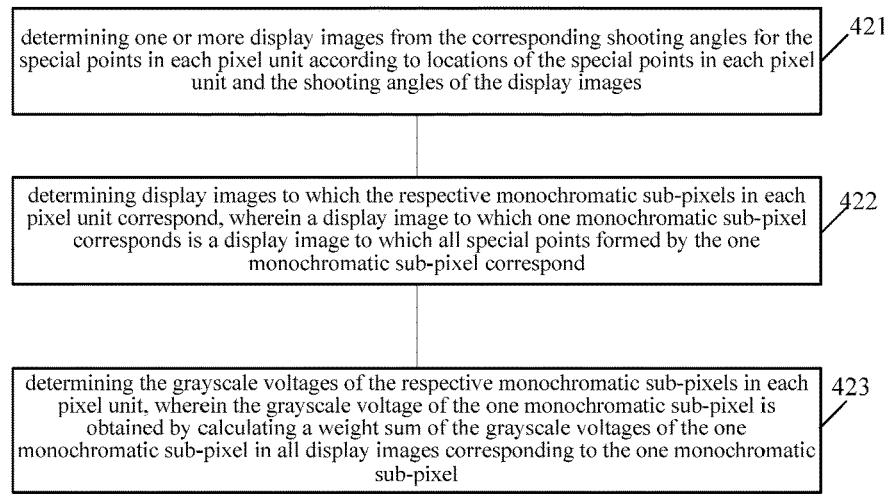
FIG. 12 is a flow chart showing a method of determining the grayscale voltages of the respective monochromatic sub-pixels in each pixel unit according to the present disclosure.

As shown in FIG. 12, the step 42 in the driving method according to the present disclosure further includes the following steps. Step 421: determining one or more display images from the corresponding shooting angles for the special points in each pixel unit according to locations of the special points in each pixel unit and the shooting angles of the display images. Step 422: determining display images to which the respective monochromatic sub-pixels in each pixel unit correspond, wherein a display image to which one monochromatic sub-pixel corresponds is a display image to which all special points formed by the one monochromatic sub-pixel correspond. Step 423: determining the grayscale voltages of the respective monochromatic sub-pixels in each pixel unit, wherein the grayscale voltage of the one monochromatic sub-pixel is obtained by calculating a weight sum of the grayscale voltages of the one monochromatic sub-pixel in all display images corresponding to the one monochromatic sub-pixel.

It can be understood from the above-described solution that, in the present disclosure, screens from the plurality of shooting angles are assigned to special points in the pixel unit, and a reference for an assigning solution is made to the corresponding relation between the location of the special point in the pixel unit and the shooting angle. It can be seen from the FIG. 2 that, one monochromatic sub-pixel and adjacent monochromatic sub-pixels of other two different colors may constitute at least one special point, and therefore one monochromatic sub-pixel needs to display images from one or a plurality of shooting angles correspondingly. According to the present disclosure, the grayscale voltage of the one monochromatic sub-pixel is obtained by calculating a weight sum of the grayscale voltages of the one monochromatic sub-pixel in all display images corresponding to the one monochromatic sub-pixel, therefore a display quality of one monochromatic sub-pixel may satisfy different viewing locations of the user for the monochromatic sub-pixel, and thus eliminating a crosstalk phenomenon.

Practical applications of the above-described step 421 to step 423 will be described in a detail manner hereinafter in combination of implementations.

Figure 5:
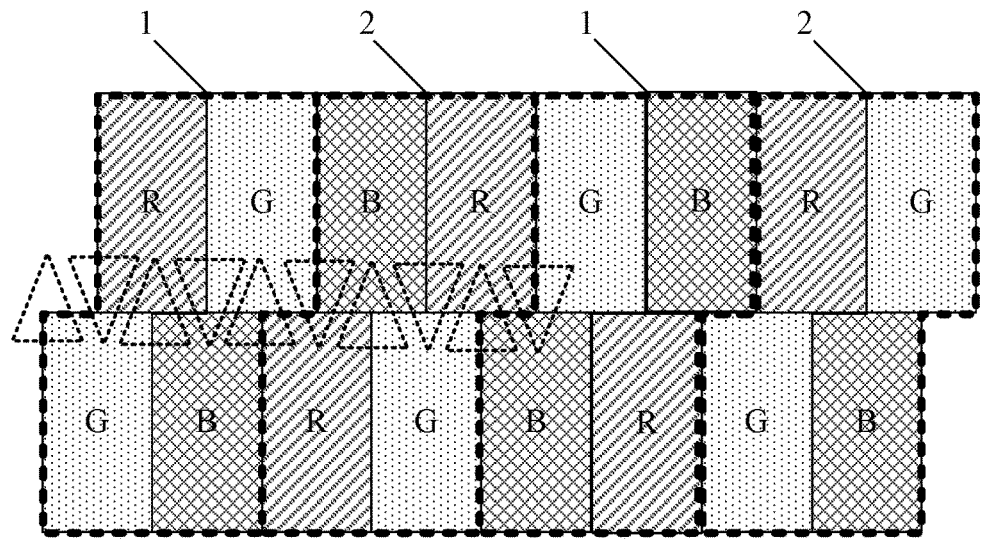
FIG. 5 and FIG. 6 each is a schematic view showing a structure of a display panel according to the present disclosure.

The solution according to the present disclosure is configured to present a 3D stereoscopic display image, and therefore the display image from each shooting angle includes a corresponding left-eye image and a corresponding right-eye image. Correspondingly, referring to the display panel shown in FIG. 5, pixel units are further divided into first pixel units 1 for displaying the left-eye image and second pixel units 2 for displaying the right-eye image; the first pixel units 1 and the second pixel units 2 are arranged alternately in the row direction. It can be seen from the structure shown in FIG. 5 that, in adjacent first pixel units 1 and second pixel units 2, there are ten locations available to constitute special points (i.e., the delta-shaped regions represented by dotted lines).

Figure 6:
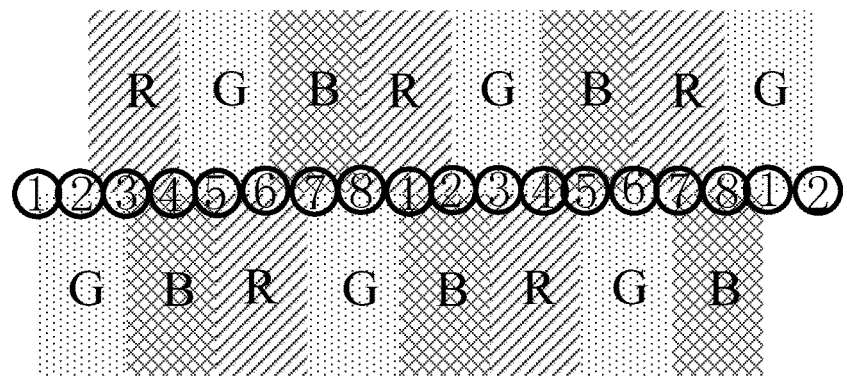

For the design of the structure, further referring to FIG. 6, it can be seen from sequences starting from a leftmost special point in the first pixel unit 1 that, eight sequence numbers constitute a cycle (i.e., the sequence number of the leftmost special point in the first pixel unit is always ①).

Based on the above arrangement, according to the present disclosure, each of the display images is provided with four shooting angles, each shooting angle corresponds to a left-eye image and a right-eye image, and the resultant eight display images in total exactly correspond to the cycle of the special points of eight sequence numbers shown in FIG. 6.

Figure 7:
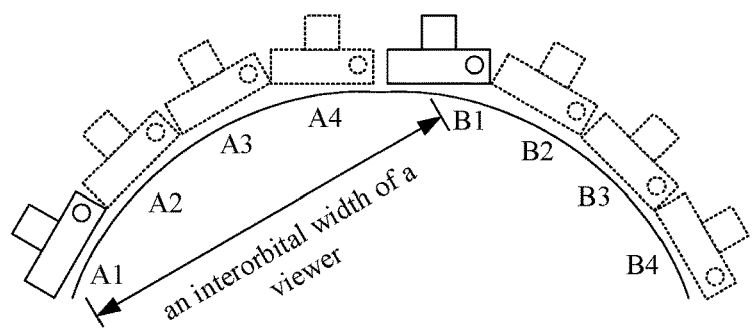
FIG. 7 is a schematic view showing display images from different shooting angles adopted in the driving method according to the present disclosure.

Further referring to FIG. 7, display images from the four shooting angles correspond to the left-eye images $A_1$ to $A_4$ and the right-eye display images $B_1$ to $B_4$. The images $A_1$ to $B_4$ are deflected towards the first direction gradually (taking a case of deflecting towards right as an example). The images $A_1$ and $B_1$ correspond to one shooting angle, that is, a distance between the $A_1$ and the $B_1$ is an interorbital width of a viewer, similarly, the images $A_2$ and $B_2$ correspond to one shooting angle, the images $A_3$ and $B_3$ correspond to one shooting angle, and the images $A_4$ and $B_4$ correspond to one shooting angle.

According to the present disclosure, the eight display images may be assigned to eight special points in each cycle. An exemplary description will be made hereinafter in combination of two implementations.

Implementation 1

It can be seen from FIG. 7 that, according to the present disclosure, the display images $A_1$ to $B_4$ may be deflected towards the first direction gradually according to a predetermined angle, a variation trend of the images $A_1$ to $B_4$ exactly corresponds to a variation trend of locations of the special points ① to ⑧ in FIG. 6, and therefore the display images $A_1$ to $B_4$ may be assigned to the special points ① to ⑧ in a one-to-one correspondence manner.

Figure 8:
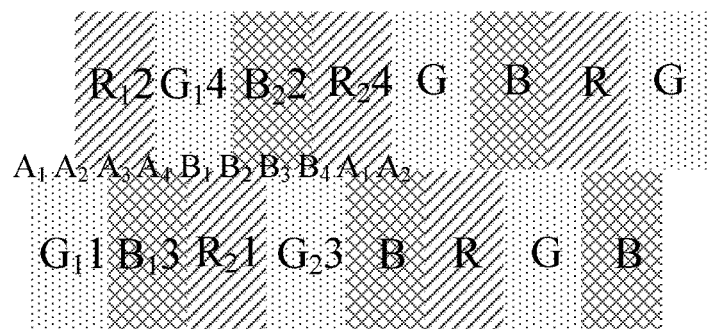
FIG. 8 and FIG. 9 each is a schematic view showing the application of the driving method of the present disclosure in different scenarios.

Referring to the structure shown in FIG. 8, in the first pixel unit, display images to which the monochromatic sub-pixel $G_1 1$ of the second pixel unit most away from a side of the first direction correspond include the left-eye images $A_1$, $A_2$ and $A_3$; display images to which the monochromatic sub-pixel $R_1 2$ of the second pixel unit second-most away from the side of the first direction correspond include the left-eye images $A_2$, $A_3$ and $A_4$, display images to which the monochromatic sub-pixel of the second pixel unit $B_1 3$ second-nearest to the side of the first direction correspond include left-eye images $A_3$, $A_4$ and the right-eye image $B_1$;

display images to which the monochromatic sub-pixel $G_1 4$ of the second pixel unit nearest to the side of the first direction correspond include the left-eye image $A_4$ and the right-eye images $B_1$, $B_2$.

When determining the grayscale voltages of the monochromatic sub-pixel $G_1 1$ in the first pixel unit, it can be seen from FIG. 8 that, the monochromatic sub-pixel $G_1 1$ corresponds to display images from the three shooting angles $A_1$, $A_2$ and $A_3$, therefore a weight sum of the grayscale voltages of $G_1 1$ in the $A_1$, the $A_2$ and $A_3$ may be calculated to obtain the grayscale voltage of the monochromatic sub-pixel $G_1 1$ during a period for driving the monochromatic sub-pixel $G_1 1$.

For example, in the specific process of calculating weight sum, the grayscale voltage of $G_1 1$ may be determined according to a formula: $(K_1 \times UA_1 + K_2 \times UA_2 + K_3 \times UA_3)/3$.

In the formula, $UA_1$, $UA_2$ and $UA_3$ represent corresponding grayscale voltages of $G_1 1$ in the display images $A_1$, $A_2$ and $A_3$ respectively; $K_1$, $K_2$ and $K_3$ each represents a weight coefficient, a value of the weight coefficient may be determined according to actual display needs, in the case that it does not need to be differentiated, the value may be 1, which is not particularly defined herein.

When determining the grayscale voltages of the monochromatic sub-pixel $R_1 2$ in the first pixel unit, it can be seen from FIG. 8 that, the monochromatic sub-pixel $R_1 2$ corresponds to display images from the three shooting angles $A_2$, $A_3$ and $A_4$, therefore a weight sum of the grayscale voltages of the monochromatic sub-pixel $R_1 2$ in the images $A_2$, $A_3$ and $A_4$ may be calculated to obtain the grayscale voltage of the monochromatic sub-pixel $R_1 2$ during the period for driving the monochromatic sub-pixel $R_1 2$. The weight coefficient may be set according to needs, which is not particularly defined herein.

Similarly, the grayscale voltage of the monochromatic sub-pixel $B_1 3$ is obtained by calculating a weight sum of the grayscale voltages of the monochromatic sub-pixel $B_1 3$ in the images $A_3$, $A_4$ and $B_1$; the grayscale voltage of the monochromatic sub-pixel $G_1 4$ is obtained by calculating a weight sum of the grayscale voltages of the one $G_1 4$ in the images $A_4$, $B_1$ and $B_2$.

In the second pixel unit, display images to which the monochromatic sub-pixel $R_2 4$ of the first pixel unit most away from a side of the second direction correspond include the left-eye images $A_1$, $A_2$ and the right-eye image $B_4$; display images to which the monochromatic sub-pixel $G_2 3$ of the first pixel unit second-most away from the side of the second direction correspond include the left-eye image $A_1$ and the right-eye images $B_4$, $B_3$; display images to which the monochromatic sub-pixel $B_2 2$ of the first pixel unit second-nearest to the side of the second direction correspond include the right-eye images $B_4$, $B_3$ and $B_2$; display images to which the monochromatic sub-pixel $R_2 1$ of the first pixel unit nearest to the side of the second direction correspond include the right-eye images $B_3$, $B_2$ and $B_1$. The second direction and the first direction are opposite to each other; herein for example, the second direction is a left direction.

Therefore, the grayscale voltage of the monochromatic sub-pixel $R_2 4$ is obtained by calculating a weight sum of the grayscale voltages of the monochromatic sub-pixel $R_2 4$ in the images $B_4$, $A_1$ and $A_2$; the grayscale voltage of the monochromatic sub-pixel $G_2 3$ is obtained by calculating a weight sum of the grayscale voltages of the monochromatic sub-pixel $G_2 3$ in the images $B_4$, $B_3$ and $A_1$; the grayscale voltage of the monochromatic sub-pixel $B_2 2$ is obtained by calculating a weight sum of the grayscale voltages of the monochromatic sub-pixel $B_2 2$ in the images $B_4$, $B_3$ and $B_2$; and the grayscale voltage of the monochromatic sub-pixel $R_2 1$ is obtained by calculating a weight sum of the grayscale voltages of the monochromatic sub-pixel $R_2 1$ in the images $B_3$, $B_2$ and $B_1$.

Obviously, on the basis of the technical solution in the above implementation, assuming that the user is at a non-best viewing location, a visible region acquired by the left eye of the user from the optical component shown in FIG. 3 includes the monochromatic sub-pixel $G_1 4$, $B_2 2$, $B_1 3$ and $R_2 1$ in FIG. 8. Obviously, it can be understood from the above that, although the four monochromatic sub-pixels $G_1 4$, $B_2 2$, $B_1 3$ and $R_2 1$ may form a shape of a pixel unit, but the $G_1 4$ and the $B_1 3$ are monochromatic sub-pixels in a left-eye pixel unit, while the $B_2 2$ and the $R_2 1$ are monochromatic sub-pixels in a right-eye pixel unit. In the case that the driving method according to the present disclosure is not adopted, the crosstalk phenomenon mentioned in the related art occurs to some extent in the display image of the region that the left eye of the user views through the optical component. In contrast, in the driving method according to the present disclosure, the display image has a plurality of shooting angles, and the grayscale voltage of the monochromatic sub-pixel according to the present disclosure is determined and obtained according to the location of the monochromatic sub-pixel and the shooting angle. Therefore, in the case that the user moves to a non-best-viewing location from the best viewing location, the display quality of the display image has not been adversely affected in substance, thus improving a viewing experience for the user.

Implementation 2

It can be seen from FIG. 7 that, according to the present disclosure, the display images $A_1$ to $B_4$ may be deflected towards the first direction gradually according to a predetermined angle, a variation trend of the images $A_1$ to $B_4$ exactly corresponds to a variation trend of locations of special points ① to ⑧ in FIG. 6, therefore the display images $A_1$ to $B_4$ may be assigned to the special points ① to ⑧ in a one-to-one correspondence manner.

Figure 9:
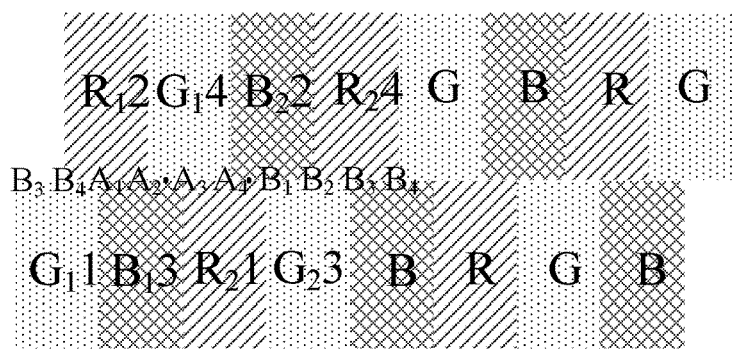

Referring to the FIG. 9, in the first pixel unit, display images to which the monochromatic sub-pixel $G_1 1$ of the second pixel unit most away from a side of the first direction correspond include the left-eye image $A_1$ and the right-eye images $B_3$ and $B_4$; display images to which the monochromatic sub-pixel $R_1 2$ of the second pixel unit second-most away from the side of the first direction correspond include the left-eye images $A_1$ and $A_2$ and the right-eye image $B_4$; display images to which the monochromatic sub-pixel of the second pixel unit $B_1 3$ second-nearest to the side of the first direction correspond include the left-eye images $A_1$, $A_2$ and $A_3$; display images to which the monochromatic sub-pixel $G_1 4$ of the second pixel unit nearest to the side of the first direction correspond include the left-eye images $A_2$, $A_3$ and $A_4$.

In the second pixel unit, display images to which the monochromatic sub-pixel $R_2 4$ of the first pixel unit most away from a side of the second direction correspond include the right-eye images $B_4$, $B_3$ and $B_2$; display images to which the monochromatic sub-pixel $G_2 3$ of the first pixel unit second-most away from the side of the second direction correspond include the right-eye images $B_3$, $B_2$ and $B_1$; display images to which the monochromatic sub-pixel of the first pixel unit $B_2 2$ second-nearest to the side of the second direction correspond include the right-eye images $B_2$ and $B_1$ and the left-eye image $A_4$; display images to which the monochromatic sub-pixel $R_2 1$ of the first pixel unit nearest to the side of the second direction correspond include the right-eye image $B_1$ and the left-eye images $A_4$, $A_3$. The second direction and the first direction are opposite to each other; herein for example, the second direction is a left direction.

When determining the grayscale voltages of the monochromatic sub-pixel, a method for calculating a weight sum identical to that of implementation 1 may be adopted, which is not repeated herein.

Obviously, it can be seen from implementation 1 and implementation 2 that, in the present disclosure, one first pixel unit and one second pixel unit adjacent to each other constitute a basic unit for the images of the left-eye and right-eye. In implementation 1, the eight display images are arranged sequentially in cycle to right from the leftmost special point in the first pixel unit according to an order from images $A_1$ to $B_4$. In implementation 2, the eight display images are arranged sequentially in cycle to left from the rightmost special point in second pixel unit according to an order of reverse direction from $B_4$ to $A_1$.

Obviously, on the basis of the solutions of implementation 1 and implementation 2, even if the user locates at different viewing locations or moves the sight line, a corresponding display image of a proper angle is still available, thus realizing a high quality of 3D display.

It is described the driving method according to the present disclosure in practical applications. It should be noted that, the above implementations 1 and 2 are optional embodiments of the present disclosure. In the driving method, according to the present disclosure, the number of shooting angles for the display image are not limited; for example, the display image may have eight visible angles, each of the special points may correspond to a display image with two visible angles, and appropriate modifications may be made to the arrangement according to actual needs, and these modifications shall also fall within the scope of the present disclosure.

Figure 13:
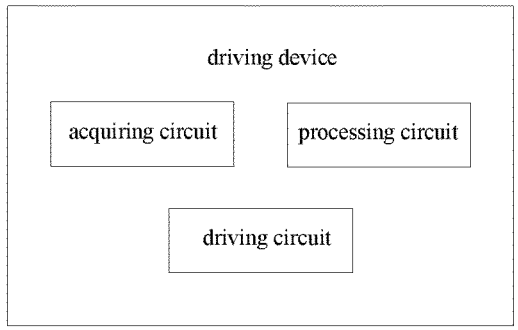
FIG. 13 is a schematic view showing a driving device for driving the display module according to the present disclosure.

In addition, as shown in FIG. 13, the present disclosure further provides a driving device for driving the above display module. The driving device includes: an acquiring circuit configured to acquire display images from a plurality of shooting angles; a processing circuit configured to determine grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and a driving circuit configured to drive the monochromatic sub-pixels in each pixel unit according to the determined grayscale voltages of the respective monochromatic sub-pixels in the pixel unit.

Obviously, the driving device according to the present disclosure and the driving method according to the present disclosure correspond to each other, therefore identical technical effects may be achieved.

Figure 14:
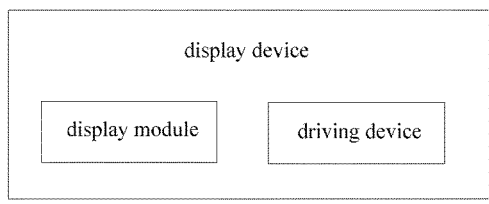
FIG. 14 is a schematic view showing a display device according to the present disclosure.

In addition, as shown in FIG. 14, the present disclosure further provides a display device including the display module and the driving device provided by the present disclosure. On the basis of the display module and the driving device, the display device according to the present disclosure may provide the user with continuous viewable locations, which enables the user to gain a better viewing experience.

Figure 1:
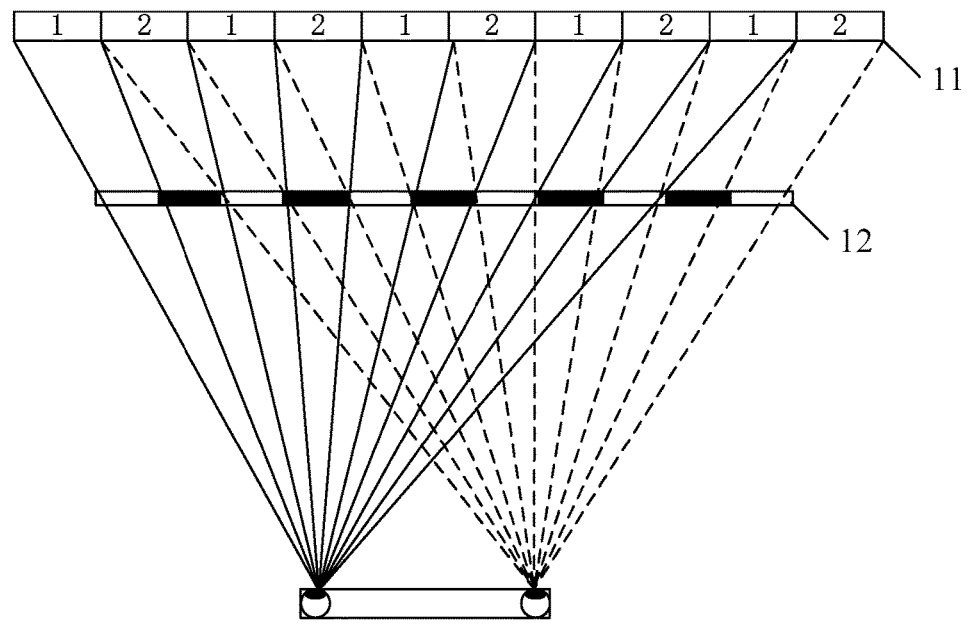
FIG. 1 is a schematic view showing naked-eye 3D display technology in a related art.
Figure 10:
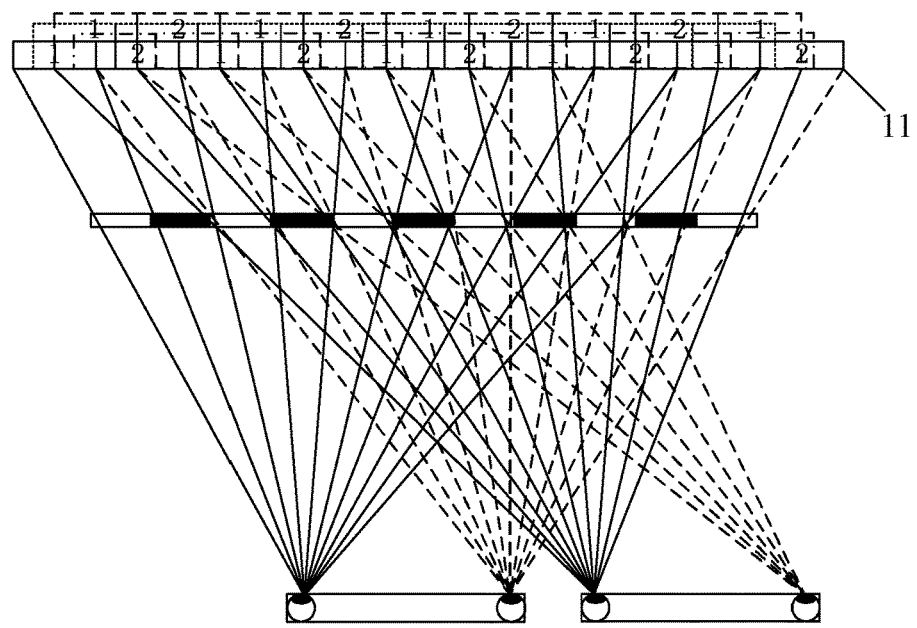
FIG. 10 is a schematic view showing a user viewing the display device according to the present disclosure.

For example, reference is made to FIG. 10, which is a schematic view showing a user viewing the display device according to the present disclosure. As compared with FIG. 1 in the related art, in the display panel 11 according to the present disclosure, the monochromatic sub-pixels are staggered, therefore the user may be provided with continuous viewable locations. Meanwhile, on the basis of the driving device according to the present disclosure, monochromatic sub-pixels to which different viewing locations correspond may display images from appropriate shooting angles, thus eliminating a crosstalk phenomenon between a left-eye image and a right-eye image, and improving the display quality when the user views the images at different locations.

The above are merely the preferred embodiments of the present disclosure, but the present disclosure is not limited thereto. Obviously, a person skilled in the art may make further modifications, substitutions and improvements without departing from the spirit of the present disclosure, and these modifications and improvements shall also fall within the scope of the present disclosure.

What is claimed is:

1. A method for driving a display module, wherein
the display module includes a display panel, wherein the display panel includes a plurality of pixel repeat units, each of the pixel repeat units comprises first monochromatic sub-pixels, second monochromatic sub-pixels, and third monochromatic sub-pixels of different colors;
each of the pixel repeat units comprises three pixel units arranged in sequence in a row direction;
each of the pixel units comprises two monochromatic sub-pixels in a first row and two monochromatic sub-pixels in a second row;
the two monochromatic sub-pixels in the first row and the two monochromatic sub-pixels in the second row are staggered at a pre-determined width; and
in the display panel, a color of each monochromatic sub-pixel is different from colors of adjacent monochromatic sub-pixels;
the display module further includes an optical component arranged at a light-exiting side of the display panel, wherein the optical component includes a plurality of optical units, each of the optical units corresponds to a user-visible region and at least one pixel unit, and the pixel unit to which each optical unit corresponds is configured to form an image in the visible region to which the optical unit corresponds,
the method comprising:
acquiring display images from a plurality of shooting angles;
determining grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and
driving the monochromatic sub-pixels in each pixel unit according to the determined grayscale voltages of the respective monochromatic sub-pixels in the pixel unit.

2. The method according to claim 1, wherein
the pre-determined width is half a width of the monochromatic sub-pixel in the row direction.

3. The method according to claim 2, wherein the first monochromatic sub-pixel is a red sub-pixel, the second monochromatic sub-pixel is a green sub-pixel, and the third monochromatic sub-pixel is a blue sub-pixel.

4. The method according to claim 1, wherein the first monochromatic sub-pixel is a red sub-pixel, the second monochromatic sub-pixel is a green sub-pixel, and the third monochromatic sub-pixel is a blue sub-pixel.

5. The method according to claim 1, wherein
the optical component is a grating structure, the grating structure comprises a plurality of light-shielding patterns, each of the light-shielding patterns comprises a plurality of light-shielding sub-patterns;
in a same light-shielding pattern, the light-shielding sub-patterns are arranged in a column direction and in different rows, the light-shielding sub-patterns in two adjacent rows are staggered at a pre-determined width, and two light-shielding sub-patterns spaced apart from each other at an interval of one light-shielding sub-pattern are aligned with each other;
a width of each light-shielding sub-pattern in the row direction is twice a width of the monochromatic sub-pixel in the row direction, and a distance between two adjacent light-shielding sub-patterns in a same row is equal to the width of the light-shielding sub-pattern in the row direction.

6. The method according to claim 1, wherein,
in the display module, a connection region for the three monochromatic sub-pixels of different colors and adjacent to each other forms a special point,
wherein determining the grayscale voltages of the respective monochromatic sub-pixels in each pixel unit comprises:
  determining one or more display images from the corresponding shooting angles for the special points in each pixel unit according to locations of the special points in each pixel unit and the shooting angles of the display images;
  determining display images to which the respective monochromatic sub-pixels in each pixel unit correspond, wherein a display image to which one monochromatic sub-pixel corresponds is a display image to which all special points formed by the one monochromatic sub-pixel correspond; and
  determining the grayscale voltages of the respective monochromatic sub-pixels in each pixel unit, wherein the grayscale voltage of the one monochromatic sub-pixel is obtained by calculating a weight sum of the grayscale voltages of the one monochromatic sub-pixel in all display images corresponding to the one monochromatic sub-pixel.

7. The method according to claim 6, wherein
the display image from each shooting angle comprises a corresponding left-eye image and a corresponding right-eye image; pixel units of the display module are divided into first pixel units for displaying the left-eye image and second pixel units for displaying the right-eye image; the first pixel units and the second pixel units are arranged alternately in the row direction;
the display images correspond to a first shooting angle, a second shooting angle, a third shooting angle and a fourth shooting angle, and the first shooting angle to the fourth shooting angle are deflected towards a first direction gradually;
left-eye images corresponding to the first, second, third, and fourth shooting angles comprise a first left-eye image, a second left-eye image, a third left-eye image and a fourth left-eye image sequence, right-eye images corresponding to the first, second, third, and fourth shooting angles comprise a first right-eye image, a second right-eye image, a third right-eye image and a fourth right-eye image in sequence, and the shooting angles of the first left-eye image, the second left-eye image, the third left-eye image, the fourth left-eye image, the first right-eye image, the second right-eye image, the third right-eye image and the fourth right-eye image are deflected towards the first direction gradually;
in the first pixel units, display images to which the monochromatic sub-pixels of the second pixel units most away from a side of the first direction correspond comprise the first left-eye image, the third right-eye image and the fourth right-eye image; display images to which the monochromatic sub-pixels of the second pixel units second-most away from the side of the first direction correspond comprise the first left-eye image, the second left-eye image and the fourth right-eye image; display images to which the monochromatic sub-pixels of the second pixel units second-nearest to the side of the first direction correspond comprise the first left-eye image, the second left-eye image and the third left-eye image; display images to which the monochromatic sub-pixels of the second pixel units nearest to the side of the first direction correspond comprise the second left-eye image, the third left-eye image and the fourth left-eye image;
in the second pixel units, display images to which the monochromatic sub-pixels of the first pixel units most away from a side of the second direction correspond comprise the fourth right-eye image, the third right-eye image and the second right-eye image; display images to which the monochromatic sub-pixels of the first pixel units second-most away from the side of the second direction correspond comprise the third right-eye image, the second right-eye image and the first right-eye image; display images to which the monochromatic sub-pixels of the first pixel units second-nearest to the side of the second direction correspond comprise the second right-eye image, the first right-eye image and the fourth left-eye image; display images to which the monochromatic sub-pixels of the first pixel units nearest to the side of the second direction correspond comprise the first right-eye image, the fourth left-eye image and the third left-eye image; and
the second direction and the first direction are opposite to each other.

8. The method according to claim 6, wherein
the display image from each shooting angle comprises a corresponding left-eye image and a corresponding right-eye image; pixel units of the display module are divided into first pixel units for displaying the left-eye image and second pixel units for displaying the right-eye image; the first pixel units and the second pixel units are arranged alternately in the row direction;
the display images correspond to a first shooting angle, a second shooting angle, a third shooting angle and a fourth shooting angle, and the first shooting angle to the fourth shooting angle are deflected towards a first direction gradually;
left-eye images corresponding to the first, second, third, and fourth shooting angles comprise a first left-eye image, a second left-eye image, a third left-eye image and a fourth left-eye image in sequence, right-eye images corresponding to the first, second, third, and fourth shooting angles comprise a first right-eye image, a second right-eye image, a third right-eye image and a fourth right-eye image in sequence, and the shooting angles of the first left-eye image, the second left-eye image, the third left-eye image, the fourth left-eye image, the first right-eye image, the second right-eye image, the third right-eye image and the fourth right-eye image are deflected towards the first direction gradually;

in the first pixel units, display images to which the monochromatic sub-pixels of the second pixel units most away from a side of the first direction correspond comprise the first left-eye image, the second left-eye image and the third left-eye image; display images to which the monochromatic sub-pixels of the second pixel units second-most away from the side of the first direction correspond comprise the second left-eye image, the third left-eye image and the fourth left-eye image; display images to which the monochromatic sub-pixels of the second pixel units second-nearest to the side of the first direction correspond comprise the third left-eye image, the fourth left-eye image and the first right-eye image; display images to which the monochromatic sub-pixels of the second pixel units nearest to the side of the first direction correspond comprise the fourth left-eye image, the first right-eye image and the second right-eye image; and in the second pixel units, display images to which the monochromatic sub-pixels of the first pixel units most away from a side of the second direction correspond comprise the first left-eye image, the second left-eye image and the fourth right-eye image; display images to which the monochromatic sub-pixels of the first pixel units second-most away from the side of the second direction correspond comprise the first left-eye image, the fourth right-eye image and the third right-eye image; display images to which the monochromatic sub-pixels of the first pixel units second-nearest to the side of the second direction correspond comprise the fourth right-eye image, the third right-eye image and the second right-eye image; display images to which the monochromatic sub-pixels of the first pixel units nearest to the side of the second direction correspond comprise the third right-eye image, the second right-eye image and the first right-eye image.

9. A driving device for driving a display module, wherein:
the display module includes a display panel, wherein the display panel includes a plurality of pixel repeat units, each of the pixel repeat units comprises first monochromatic sub-pixels, second monochromatic sub-pixels, and third monochromatic sub-pixels of different colors; each of the pixel repeat units includes three pixel units arranged in sequence in a row direction; each of the pixel units includes two monochromatic sub-pixels in a first row and two monochromatic sub-pixels in a second row; the two monochromatic sub-pixels in the first row and the two monochromatic sub-pixels in the second row are staggered at a pre-determined width; and in the display panel, a color of each monochromatic sub-pixel is different from colors of adjacent monochromatic sub-pixels;

the display module further includes an optical component arranged at a light-exiting side of the display panel, wherein the optical component comprises a plurality of optical units, each of the optical units corresponds to a user-visible region and at least one pixel unit, and the pixel unit to which each optical unit corresponds is configured to form an image in the visible region to which the optical unit corresponds, the driving device comprising:
an acquiring circuit configured to acquire display images from a plurality of shooting angles;

a processing circuit configured to determine grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and a driving circuit configured to drive the monochromatic sub-pixels in each pixel unit according to the determined grayscale voltages of the respective monochromatic sub-pixels in the pixel unit.

10. The driving device according to claim 9, wherein
the optical component is a grating structure, the grating structure includes a plurality of light-shielding patterns, each of the light-shielding patterns includes a plurality of light-shielding sub-patterns;

in a same light-shielding pattern, the light-shielding sub-patterns are arranged in a column direction and in different rows, the light-shielding sub-patterns in two adjacent rows are staggered at a pre-determined width, and two light-shielding sub-patterns spaced apart from each other at an interval of one light-shielding sub-pattern are aligned with each other;

a width of each light-shielding sub-pattern in the row direction is twice a width of the monochromatic sub-pixel in the row direction, and a distance between two adjacent light-shielding sub-patterns in a same row is equal to the width of the light-shielding sub-pattern in the row direction.

11. The driving device according to claim 10, wherein
the pre-determined width is half a width of the monochromatic sub-pixel in the row direction.

12. The driving device according to claim 10, wherein the first monochromatic sub-pixel is a red sub-pixel, the second monochromatic sub-pixel is a green sub-pixel, and the third monochromatic sub-pixel is a blue sub-pixel.

13. The driving device according to claim 9, wherein
the pre-determined width is half a width of the monochromatic sub-pixel in the row direction.

14. The driving device according to claim 9, wherein the first monochromatic sub-pixel is a red sub-pixel, the second monochromatic sub-pixel is a green sub-pixel, and the third monochromatic sub-pixel is a blue sub-pixel.

15. A display device, comprising: a display module, and a driving device configured to drive a display module, wherein the display module includes a display panel, wherein the display panel includes a plurality of pixel repeat units, each of the pixel repeat units includes first monochromatic sub-pixels, second monochromatic sub-pixels, and third monochromatic sub-pixels of different colors; each of the pixel repeat units includes three pixel units arranged in sequence in a row direction; each of the pixel units includes two monochromatic sub-pixels in a first row and two monochromatic sub-pixels in a second row; the two monochromatic sub-pixels in the first row and the two monochromatic sub-pixels in the second row are staggered at a pre-determined width; and in the display panel, a color of each monochromatic sub-pixel is different from colors of adjacent monochromatic sub-pixels;

the display module further includes an optical component arranged at a light-exiting side of the display panel, wherein the optical component comprises a plurality of optical units, each of the optical units corresponds to a user-visible region and at least one pixel unit, and the pixel unit to which each optical unit corresponds is configured to form an image in the visible region to which the optical unit corresponds; and the driving device comprising:
- an acquiring circuit configured to acquire display images from a plurality of shooting angles;
- a processing circuit configured to determine grayscale voltages of respective monochromatic sub-pixels in each pixel unit, wherein the grayscale voltage of one monochromatic sub-pixel is obtained by calculating a weight sum of grayscale voltages of the display images from different shooting angles according to a location of the one monochromatic sub-pixel in the pixel unit; and
- a driving circuit configured to drive the monochromatic sub-pixels in each pixel unit according to the determined grayscale voltages of the respective monochromatic sub-pixels in the pixel unit.

16. The display device according to claim 15, wherein
the optical component is a grating structure, the grating structure includes a plurality of light-shielding patterns, each of the light-shielding patterns includes a plurality of light-shielding sub-patterns;
in a same light-shielding pattern, the light-shielding sub-patterns are arranged in a column direction and in different rows, the light-shielding sub-patterns in two adjacent rows are staggered at a pre-determined width, and two light-shielding sub-patterns spaced apart from each other at an interval of one light-shielding sub-pattern are aligned with each other;
a width of each light-shielding sub-pattern in the row direction is twice a width of the monochromatic sub-pixel in the row direction, and a distance between two adjacent light-shielding sub-patterns in a same row is equal to the width of the light-shielding sub-pattern in the row direction.

17. The display device according to claim 16, wherein
the pre-determined width is half a width of the monochromatic sub-pixel in the row direction.

18. The display device according to claim 16, wherein the first monochromatic sub-pixel is a red sub-pixel, the second monochromatic sub-pixel is a green sub-pixel, and the third monochromatic sub-pixel is a blue sub-pixel.

19. The display device according to claim 15, wherein
the pre-determined width is half a width of the monochromatic sub-pixel in the row direction.

20. The display device according to claim 15, wherein the first monochromatic sub-pixel is a red sub-pixel, the second monochromatic sub-pixel is a green sub-pixel, and the third monochromatic sub-pixel is a blue sub-pixel.

* * * * *